Patented Nov. 16, 1943

2,334,490

UNITED STATES PATENT OFFICE 2,334,490

DERIVATIVES OF DIHYDRO-PYRIDONE AND PROCESS FOR THEIR MANUFACTURE

Max Hoffer, Basel, Switzerland, assignor to Hoffmann-La Roche Inc., Nutley, N. J., a corporation of New Jersey No Drawing. Application February 18, 1941, Serial No. 379,547. In Switzerland March 29, 1940

8 Claims. (Cl. 260—295)

It has been found that hitherto unknown derivatives of dihydro-pyridone can be obtained if strong acids, in presence or absence of a solvent, are caused to act on nitriles or amides of derivatives of α-cyano-γ-acetyl-glutaric acid mono ester prepared by reacting aldehydes simultaneously with acetoacetic ester and amide or nitrile derivatives of cyanacetic acid in presence of a secondary amine. As strong acids there may be used any acid which in dilute aqueous solution dissociates practically completely, especially strong mineral acids, such as halogen acids, sulfuric acid, perchloric acid, and others. But also a strong organic acid, such as a sulfonic acid, for instance, methyl-sulfonic acid, phenyl-sulfonic acid or a homologue can be employed. Ring closure is effected thereby with isomerisation when a nitrile is used or with elimination of one molecule of water, when employing an amide forming a derivative of dihydropyridone which carries a methyl-group in position 2, a carbalkoxy-group in position 3, a radical R in postion 4 corresponding to the radical of the aldehyde used, in position 5 a cyano-group, and in position 6 the enolised oxo-group of the pyridone.

A solvent is of advantage if the direct intimate contact between the starting material and the acid cannot be brought about readily, for instance, if the acid is employed in the gaseous state, such as, for example, in the case of hydrogen chloride. As solvents there may be used all the known materials liquid at ordinary or slightly raised temperature which dissolve the starting material and the acid sufficiently to ensure contact. These include alcohols, acids, such as formic acid, acetic acid and homologues, halogenated hydrocarbons, such as chloroform, carbon tetrachloride and others, or suitable mixtures of the solvents amongst themselves, as well as water.

R can represent any organic, aliphatic, aromatic, aromaticaliphatic or cycloaliphatic radical, provided, of course, that it does not itself undergo any changes under the reaction conditions, thus, for instance, R can represent an aliphatic radical such as methyl, ethyl, propyl, isopropyl, butyl, homologues thereof and isomers, allyl or crotyl with homologues and isomers, as well as an aromatic radical, such as, for instance, phenyl, benzyl, styryl and their homologues; furthermore, α- and β-naphthyl and other radicals of condensed ring systems, as well as their homologues, or a cycloaliphatic radical, such as cyclopentyl, cyclohexyl and their homologues and analogues. R may also be a hydrocarbon radical containing substituents, such as halogen, a free or protected hydroxy-group, a nitro-group, carboxyl-group and other radicals. Those compounds are of special interest in which the radical R represents a hydroxy-methyl-group —CH₂—O—R'' etherified by a radical R'', wherein R'' also stands for an aliphatic, aromatic or alicyclic radical, such as, for instance, an aliphatic radical, such as methyl, ethyl, propyl, isopropyl, butyl and its isomers and homologues, allyl, crotyl and isomers and homologues, or an aromatic radical, such as phenyl, α- and β-naphthyl and other radicals of condensed ring systems, while radicals composed of an aliphatic and aromatic radical, such as benzyl, phenylethyl, naphthylmethyl and homologues of these compounds can also be employed.

The reaction is illustrated by the following structural Formula A or B, as the case may be:

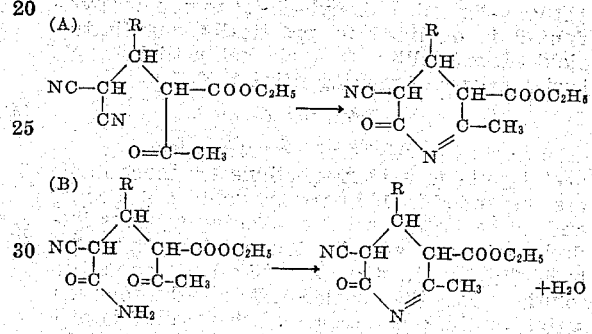

The resulting compounds can be imagined to occur in various tautomeric forms. Thus, the oxo-group can be enolised as shown by the solubility of the new materials in dilute alkali and ammonia. A further tautomerism of the double bond of the nitrogen atom, according to Formula C, can also occur.

(C)

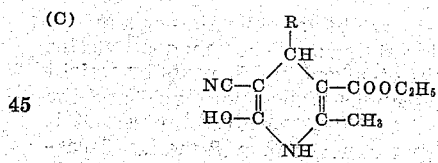

The new compounds crystallise well. They are soluble in alkali. From these solutions they can again be precipitated unchanged with acids provided conditions tending to saponify the esterified carboxyl-group are not used. The said compounds are to be employed as intermediates for the manufacture of medicinal preparations.

Example 1

100 parts by volume of ethyl-alcohol are saturated with hydrochloric acid gas at 20–30° C. Then 50 parts by weight of α-cyano-β-phenyl-γ-acetyl-glutaric acid monoethylester mononitrile are added and the whole shaken. The mixture becomes slightly warm and the nitrile goes into solution within 10 minutes. The product is left to stand for a further 10 minutes at 20–30° C. and then poured into 500 parts by weight of water. 2-methyl-3-carbethoxy-4-phenyl-5-cyano-dihydropyridone-6 quickly separates in crystalline form. It is sucked off and recrystallised from benzene. The yield is nearly quantitative. The melting point lies at 141° C.

Example 2

50 parts by weight of α-cyano-β-phenyl-γ-acetyl-glutaric acid monoethylester monoamide are suspended in 250 parts by volume of glacial acetic acid. 30 parts by weight of concentrated sulphuric acid are added to the mixture whereupon the amide goes into solution with slight evolution of heat. The clear solution is left to stand for 10 minutes and then poured into double the volume of water. The reaction product separates in the form of a syrup which soon solidifies to crystals. It is identical with the product obtained in accordance with Example 1. The yield is nearly quantitative.

Example 3

If instead of α-cyano-β-phenyl-γ-acetyl-glutaric acid monoethylester monoamide, as employed in Example 2, 50 parts by weight of α-cyano-β-p-nitrophenyl-γ-acetyl-glutaric acid ester amide are used and if the working-up proceeds in a manner analogous to the directions given in Example 2, 2-methyl-3-carbethoxy-4-p-nitrophenyl-5-cyanodihydropyridone-6 is obtained in practically quantitative yield. It crystallises from alcohol in slightly yellowish prisms of melting point 129° C.

Example 4

10 parts by weight of α-cyano-β-isopropyl-γ-acetyl-glutaric acid monoethylester mononitrile are suspended in 100 parts by volume of alcohol and 10 parts by weight of fuming aqueous hydrobromic acid added. The mixture is heated to 50–60° C. with stirring until all has gone into solution. It is then cooled and poured into much water, or the greater part of the alcohol is distilled off and the residue diluted with water. 2-methyl-3-carbethoxy-4-isopropyl-5-cyano-dihydropyridone-6 separates as an oil which, on inoculation or on standing for some time, crystallises spontaneously. It can be recrystallised from a little methanol.

Example 5

50 parts by weight of α-cyano-β-phenoxymethyl-γ-acetyl-glutaric acid monoethylester mononitrile are dissolved in 250 parts by weight of 5 per cent alcoholic hydrochloric acid and the mixture heated to 60° C. for 10 minutes. It is poured into water whereupon 2-methyl-3-carbethoxy-4-phenoxymethyl-5-cyano-dihydropyridone-6 separates as a syrup, which, on standing, solidifies to a crystalline mass. From alcohol or glacial acetic acid, it crystallises in small rosettes of prisms melting at 152° C.

Example 6

The same compound as in Example 5 is obtained if 50 parts by weight of α-cyano-β-phenoxymethyl-γ-acetyl-glutaric acid monoethylester monoamide are brought into a mixture of 200 parts by weight of glacial acetic acid and 50 parts by weight of methanesulfonic acid and poured into 4 times its volume of water after standing for half-an-hour.

I claim:

1. Compounds of the formula

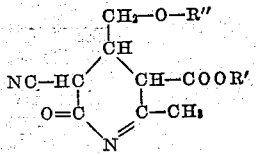

wherein R″ is selected from the group consisting of alkyl, aryl, aralkyl, and cycloalkyl radicals, and R′ represents lower alkyl.

2. 2-methyl-3-carbethoxy-4-phenoxymethyl-5-cyano-dihydro-pyridone-(6).

3. Process for the manufacture of a compound of the formula

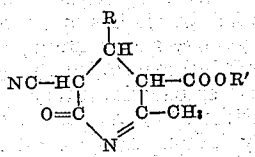

wherein R is selected from the group consisting of alkyl, alkoxyalkyl, cycloalkoxyalkyl, aryloxyalkyl, aralkyloxyalkyl, aryl, aralkyl, and cycloalkyl radicals, and R′ represents lower alkyl, comprising treating a glutaric acid derivative of the formula

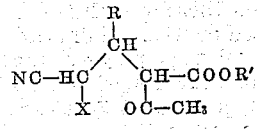

wherein X is selected from the group consisting of —CONH₂ and —CN, with a strong acid.

4. Process for the manufacture of a compound of the formula

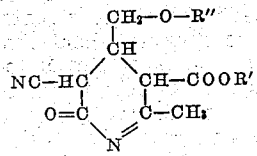

wherein R″ is selected from the group consisting of alkyl, aryl, aralkyl, and cycloalkyl radicals, and R′ represents lower alkyl, comprising treating a glutaric acid derivative of the formula

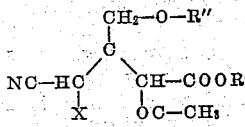

wherein X is selected from the group consisting of —CONH₂ and CN, with a strong acid.

5. Process for the manufacture of 2-methyl-3-carbalkoxy-4-phenoxymethyl-5-cyanopyridone-(6), comprising treating α-cyano-β-phenoxymethyl-γ-acetyl-glutaric acid monoalkylester mononitrile with a strong acid.

6. Process for the manufacture of 2-methyl-3-carbethoxy-4-phenoxymethyl-5-cyanopyridone-(6), comprising treating α-cyano-β-phenoxymethyl-γ-acetyl-glutaric acid monoethyl-ester mononitrile with a strong acid.

7. Process for the manufacture of 2-methyl-3-carbalkoxy-4-phenoxymethyl-5-cyanopyridone-(6), comprising treating α-cyano-β-phenoxymethyl-γ-acetyl-glutaric acid mono-alkyl-ester monoamide with a strong acid.

8. Process for the manufacture of 2-methyl-3-carbethoxy-4-phenoxymethyl-5-cyanopyridone-(6), comprising treating α-cyano-β-phenoxymethyl-γ-acetyl-glutaric acid monoethyl-ester monoamide with a strong acid.

MAX HOFFER.